Oct. 25, 1955         H. E. SCHALLER         2,721,593
KNIFE ASSEMBLY FOR MEAT CUTTING MACHINES
Filed Oct. 5, 1951         2 Sheets-Sheet 1
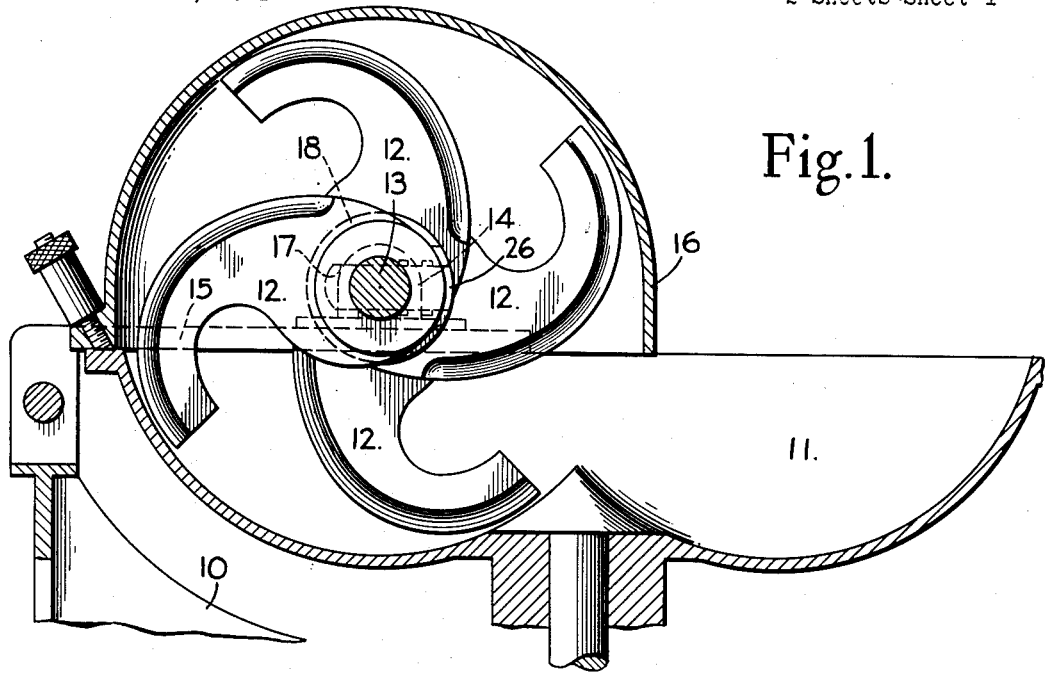
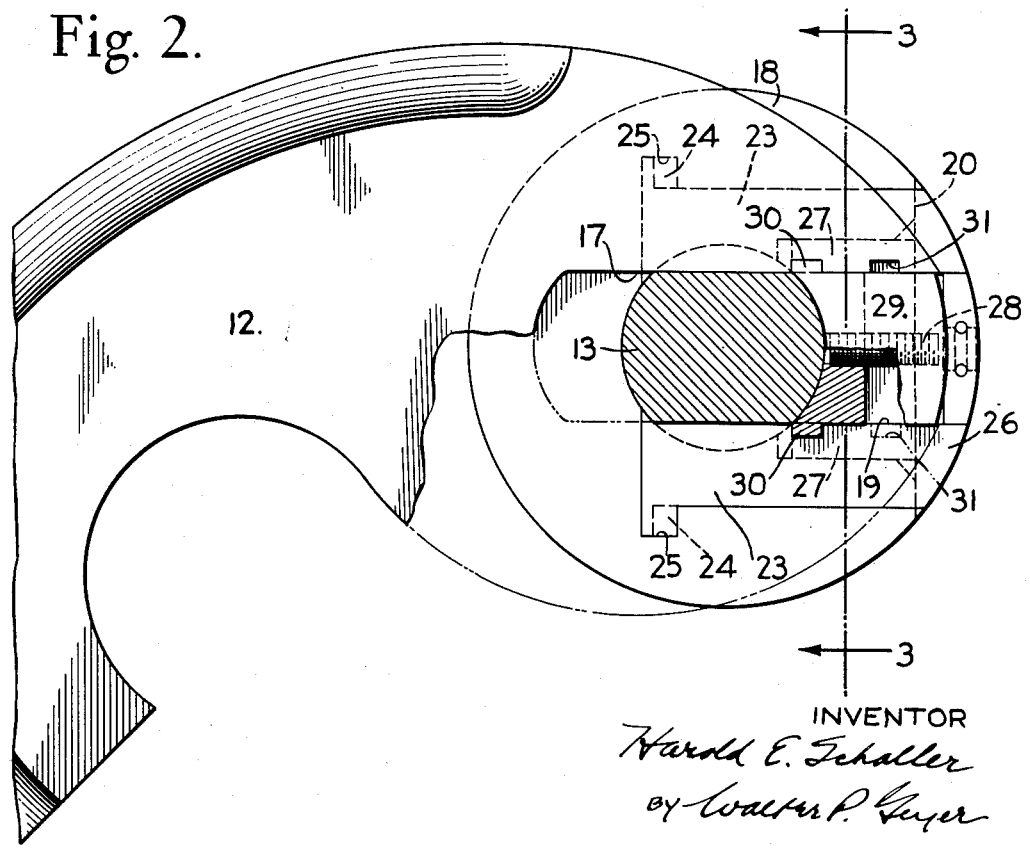
INVENTOR
Harold E. Schaller
by Walter P. Geyer
ATTORNEY Oct. 25, 1955     H. E. SCHALLER     2,721,593
KNIFE ASSEMBLY FOR MEAT CUTTING MACHINES
Filed Oct. 5, 1951     2 Sheets-Sheet 2

INVENTOR
Harold E. Schaller
BY Walter P. Geyer
ATTORNEY

United States Patent Office 2,721,593
Patented Oct. 25, 1955

2,721,593

KNIFE ASSEMBLY FOR MEAT CUTTING MACHINES

Harold E. Schaller, Buffalo, N. Y.

Application October 5, 1951, Serial No. 249,990

8 Claims. (Cl. 146—67)

This invention relates generally to meat cutting machines but more particularly to certain new and useful improvements in the cutting unit or revolving knife assembly of such machines.

It has for one of its objects to provide a knife assembly of this character which is so designed and constructed as to be readily adjustable to very close tolerances in relation to the meat bowl to insure a thorough and proper cutting of the meat, and wherein the knives constituting the assembly can be individually adjusted from a point exterior of the cutting zones.

Another object of the invention is to provide a knife assembly wherein reliable and positive means are embodied for effectually clamping or retaining the knives or blades against accidental slippage from their mounting shaft during the cutting operation and thereby affording safety to the operator and damage to the meat bowl as well as breakage of the blades.

A further object is the provision of a multiple blade cutting assembly which is so designed as to be readily assembled for use and whose parts can be as readily disassembled for cleaning purposes, to meet the sanitary requirements of the meat packing industry, without the necessity of dismantling the whole assembly from the machine.

Other features of the invention reside in the construction and arrangement of parts hereinafter described and particularly pointed out in the appended claims.

Figure 3:
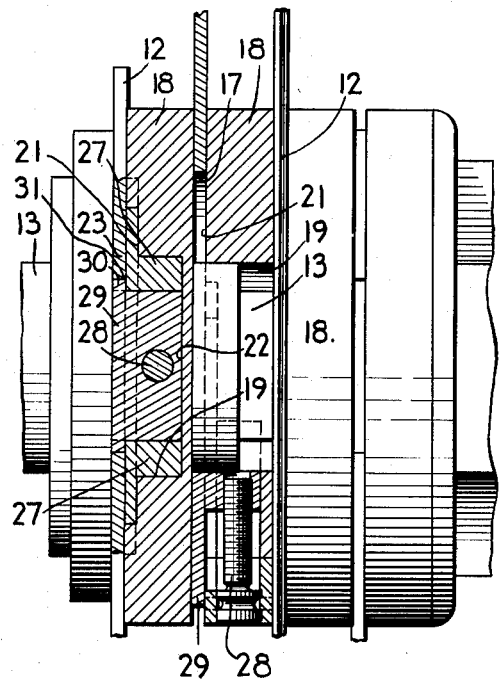
Figure 4:
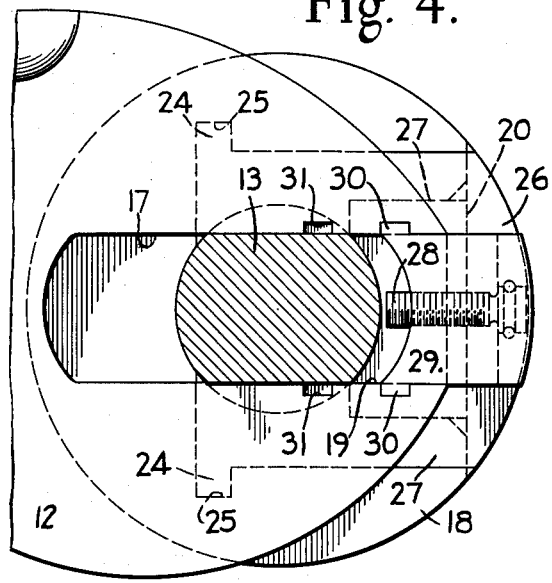
Figure 5:
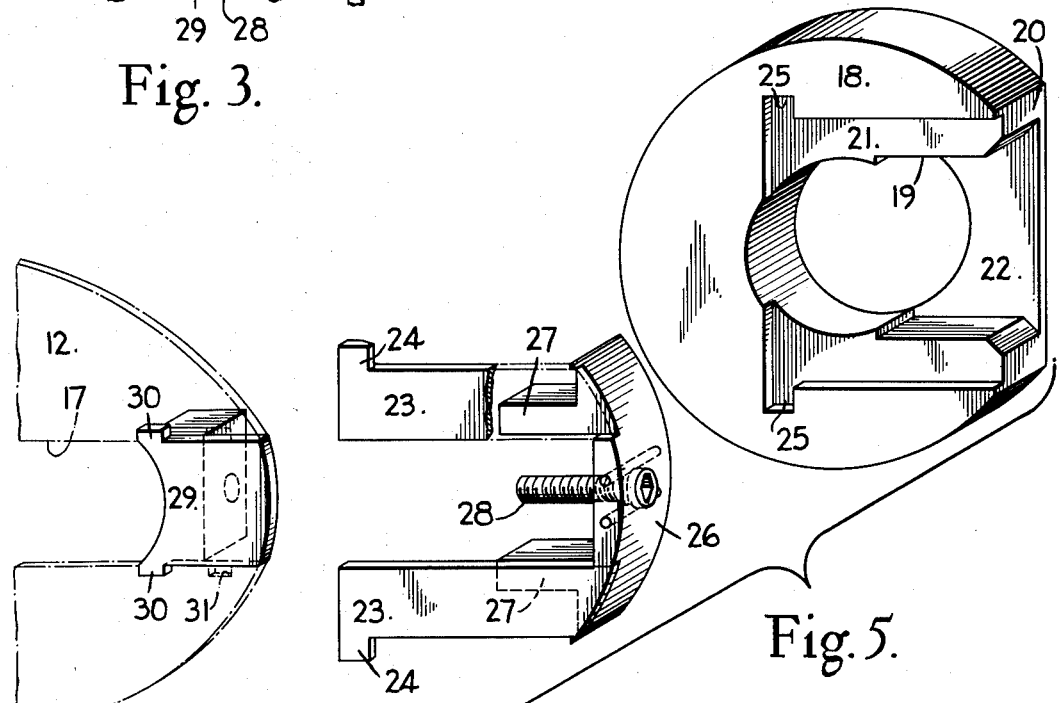

In the accompanying drawings:

Figure 1 is a fragmentary transverse section of a meat cutting machine equipped with my improved knife assembly. Figure 2 is an enlarged fragmentary side elevation, partly in section, of the knife assembly. Figure 3 is a fragmentary sectional view taken on line 3—3, Figure 2. Figure 4 is a fragmentary view, similar to Figure 2, showing the blade in a different position of adjustment. Figure 5 is an exploded perspective view of the parts of the knife mounting assembly.

Similar characters of reference indicate corresponding parts throughout the several views.

By way of example, the improved knife assembly has been shown in connection with a revolving bowl type of meat cutting machine, wherein 10 indicates its base frame, 11 the revolving bowl which is of the usual annular trough-like construction, and 12 indicates the knife or blade assembly whose knives rotate at a high speed within the bowl trough to cut the meat as it is advanced. This knife assembly is mounted on a transverse drive shaft 13 journaled in bearings 14 carried by a cover plate 15 supported on the frame and arranged over the bowl at one side of its axis and a suitable hood 16 is provided for enclosing the knives of the assembly. Any suitable means may be provided for driving the meat bowl and the knives.

The knife assembly constituting the subject matter of this application is so designed that the knives, which are disposed side by side in spaced axial relation and clamped as a unit angularly at different radial positions about the shaft, can be individually adjusted to close tolerances and the parts of the assembly readily removed for easy cleaning and at the same time so constructed as to effectually retain the knives against creeping or accidental displacement during cutting operations. As is common in this art, one end of the knife assembly is arranged to engage a flange formed on the knife-shaft while its other end is engaged by a clamping nut. Each knife consists of a curved blade having a radial notch or recess 17 in its hub portion for engaging opposing parallel faces or flat spots formed on the knife-shaft 13 to securely position the knife angularly thereon and compel its rotation with the shaft, successive knives being positioned at progressive angles about the shaft. Mounted on the knife-shaft and operatively associated with each knife and constituting spacers between the knives in the assembly, as well as supports on which the respective knives are adjustably mounted is a collar 18 having a radial notch 19 therein for registration with the companion blade-notch. That edge or peripheral portion of the collar at right angles to and intersecting the radial plane of the open end of its notch is cut straight or in chord-like fashion, as shown at 20 in Figure 5, for a purpose which will hereinafter appear.

In one face thereof, each collar 18 is recessed or mortised along the margins of its notch to provide a substantially T-shaped, shallow recess 21 radiating outwardly from a point adjacent the collar-axis and a paralleling counterrecessed portion 22 which extends outwardly from the bore of the collar-axis and whose faces form radial guide ways. Removably seated in the recessed portions of the collar is a complementary blade-clamping member in the form of a substantially U-shaped plate 23 whose leg portions lie within the shallow recess 21 in flush relation to the face of the collar and terminate at their inner ends in laterally-projecting lugs 24 which engage the companion lateral portions 25 of such recess 21, whereby this plate is retained against radial and transverse displacement relative to the collar. The outer closed end or cross head portion 26 of the plate 23 is of substantially arcuate or segmental shape and abuts at its inner straight edge against the straight peripheral edge portion 20 of the collar while its outer curved edge conforms to that of the collar. Depending from the undersides of the plate legs and paralleling the opposing inner edges thereof for a portion of their length are guide lugs 27 which engage the counterrecessed portion 22 of the collar. Fitted against axial displacement in the cross-head portion 26 of the plate 23 is an adjusting screw 28 which extends inwardly into the space between the plate-legs.

The numeral 29 indicates an adjustable knife-coupling member or block whose outer face projects beyond the recessed face of the collar and its plate 23 a distance corresponding to the thickness of the knife and which is slidingly guided on the lugs 27 of the clamping plate for movement in opposing relation to its cross head 26 and has a threaded opening therein with which the adjusting screw 28 engages. At its inner end this block has laterally-extending lugs 30 which overhang the marginal outer faces of the plate-legs in sliding relation thereto and are adapted for coupling engagement with the knife so that the latter will be moved with the block and relative to the shaft 13 to a selective adjusted position upon actuating the adjusting screw. The marginal edges of the knife-recess 17 are provided with a plurality of opposing alined notches 31, one or another alined set of which is adapted to engage the block-lugs 27 to radially position the knife where desired before effecting any fine adjustment thereof in relation to the bowl 11 through the medium of the block 29 and its adjusting screw 28.

While manifestly simple in construction, this knife assembly affords a maximum of safety to the operators of meat cutting machines, it enables the knives to be individually replaced or adjusted to close tolerance adjustments in relation to the bowl, and it permits disassembly of its parts for ready cleaning without dismantling the whole assembly from the machine.

I claim as my invention:

1. In a meat cutting machine, a rotary bowl having an annular meat trough, and a rotary shaft having a plurality of individual cutting blade units mounted in side by side relation on said shaft for operation in said trough, each unit including a cutting blade having a notched shaft-engaging portion, a collar mounted on said shaft and having a radial recess in one face thereof, a blade clamping member removably seated in said collar-recess and having an adjusting screw applied to the outer end thereof, and a guide plate applied to said blade clamping member for radial movement relative thereto and operatively connected to said screw for actuation thereby, said blade and said guide plate having complemental interengaging notches and tongues thereon.

2. In a meat cutting machine, a rotary bowl having an annular meat trough, and a rotary shaft having a plurality of individual cutting blade units mounted in side by side relation on said shaft for operation in said trough, each unit including a cutting blade having a notched shraft-engaging portion, a collar mounted on said shaft and having a substantially T-shaped recess therein radiating outwardly from a point adjacent the axis thereof, a blade clamping member removably seated in and having portions complemental in shape to said recess and including a cross head at its outer end having a radially-disposed adjusting screw therein, and a guide plate applied to said blade clamping member for radial movement relative thereto and operatively connected to said screw for actuation thereby, said blade and said guide plate having inter-engaging notches and tongues thereon.

3. In a meat cutting machine, a rotary bowl having an annular meat trough, and a rotary shaft having a plurality of individual cutting blade units mounted in side by side relation on said shaft for operation in said trough, each unit including a cutting blade having a notched shaft-engaging portion, a collar mounted on said shaft and having a recess in one face thereof radiating outwardly from a point adjacent the axis thereof, a substantially U-shaped blade clamping member removably seated in said recess against radial and transverse displacement and having a radially-disposed adjusting screw in the closed outer portion thereof, and a guide plate applied to said blade clamping member for relative radial movement along the leg portions thereof and operatively connected to said screw for actuation thereby toward and from the collar-axis, said blade having opposing notches in the marginal edges of its shaft-engaging slot and said guide plate having companion coupling tongues projecting from its opposite side edges for releasable engagement with said notches.

4. A cutting blade assembly, comprising a plurality of blades each having a notched shaft-engaging hub portion, a plurality of collars disposed between said blades and each having a radial recess in one face thereof, blade-clamping members removably seated in said companion collar-recesses against radial and transverse displacement and each having a radial adjusting screw applied to the outer end thereof, and guide plates applied to the blade-clamping members for radial movement relative thereto and operatively connected to the companion adjusting screws thereof for actuation thereby, the notched-engaging hub portions of the blades and said guide plates having complemental elements thereon for detachable coupling engagement with each other.

5. A cutting blade assembly, comprising a plurality of blades each having a notched shaft-engaging hub portion, a plurality of collars disposed between said blades and each having a substantially T-shaped recess therein radiating outwardly from a point adjacent the axis thereof, blade clamping members removably seated in and having portions complemental in shape to said collar-recess and each including a cross head at its outer end having a radially-disposed adjusting screw therein, and guide plates applied to the blade clamping members for radial movement relative thereto and operatively connected to the companion adjusting screws thereof for actuation thereby, the notched-engaging hub portions of the blades and said guide plates having complemental elements thereon for detachable coupling engagement with each other.

6. A cutting blade assembly, comprising a plurality of blades each having a notched shaft-engaging hub portion, a plurality of collars disposed between said blades and each having a radial recess in one face thereof, and adjustable blade clamping means detachably applied to said collars and each including a plate removably seated in the companion collar-recess against radial and transverse displacement and having a radial adjusting screw applied to the outer end thereof and a blade-engaging guide plate applied to such companion removable plate for movement relative thereto and operatively connected to the companion adjusting screw thereof for actuation thereby, the notched-engaging hub portions of the blades and the companion guide plates having complemental elements thereon for detachable coupling engagement with each other.

7. A cutting blade assembly, comprising a plurality of blades each having a notched shaft-engaging hub portion, a plurality of collars disposed between said blades and each having a radial recess in one face thereof, said recess including comparatively shallow, parallel side portions extending substantially tangentially from diametrically opposite sides of the collar-opening to the periphery of the collar and a deeper medial portion therebetween disposed radially of the collar, substantially U-shaped plate-like members removably seated in the side portions of the companion collar-recesses in flush relation to the companion side faces of the collars and with their closed ends spanning the outer ends of the medial portions of such recesses and having companion radially-disposed adjusting screws applied thereto, the inner face of each plate-like member adjoining its closed end having ribs thereon engaging the companion side edges of the medial portion of the companion collar-recess, and guide plates applied to said plate-like members for radial movement relative thereto in guiding contact with the ribs thereof and operatively connected to said companion adjusting screws, said guide plates having means at its opposite sides for detachable coupling engagement with the notched shaft-engaging hub portions of the blade.

8. In a meat cutting machine, a rotary bowl having an annular meat trough, and a rotary shaft having a plurality of individual cutting blade units mounted in side by side relation on said shaft for operation in said trough, each unit including a cutting blade having a notched shaft-engaging portion, a radially-recessed collar mounted on said shaft, a blade clamping member fitted in said recess and having an adjusting screw thereon, and a radially adjustable member in operative engagement with said screw and detachably applied to said collar with its outer face projecting beyond the contiguous face of the collar a distance substantially corresponding to that of the thickness of the cutting blade and having blade-engaging tongues at its opposite sides and in the plane of said projected outer face, the notched shaft-engaging portion of the cutting blade having notches therein engageable with said tongues.

References Cited in the file of this patent

UNITED STATES PATENTS

| | | |
|---|---|---|
| 812,784 | Clay et al. | Feb. 13, 1906 |
| 869,113 | True | Oct. 22, 1907 |
| 950,448 | Hege | Feb. 22, 1910 |

FOREIGN PATENTS

| | | |
|---|---|---|
| 223,771 | Switzerland | Dec. 16, 1942 |
| 594,588 | Great Britain | Nov. 14, 1947 |